Inventor
O. R. Humphreys
W. G. Humphreys
By Arthur H. Sturge
Attorney

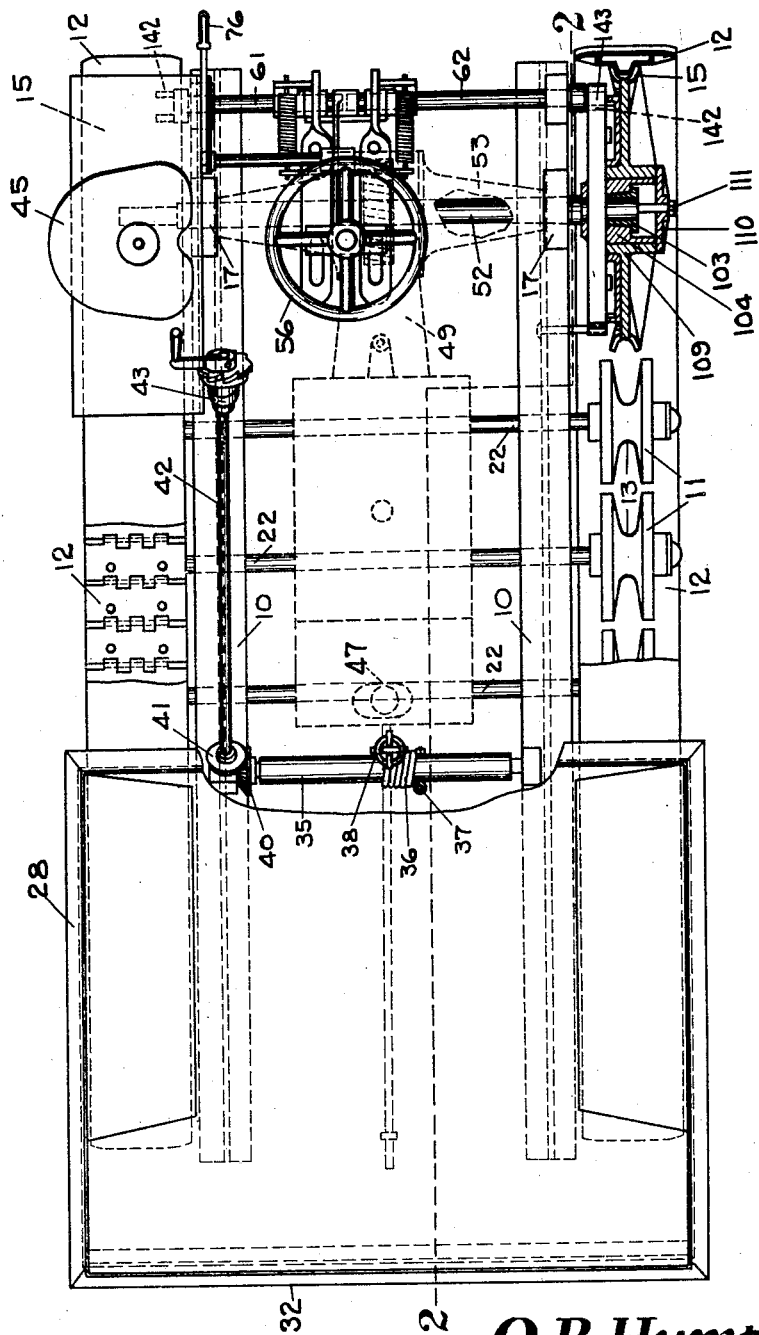

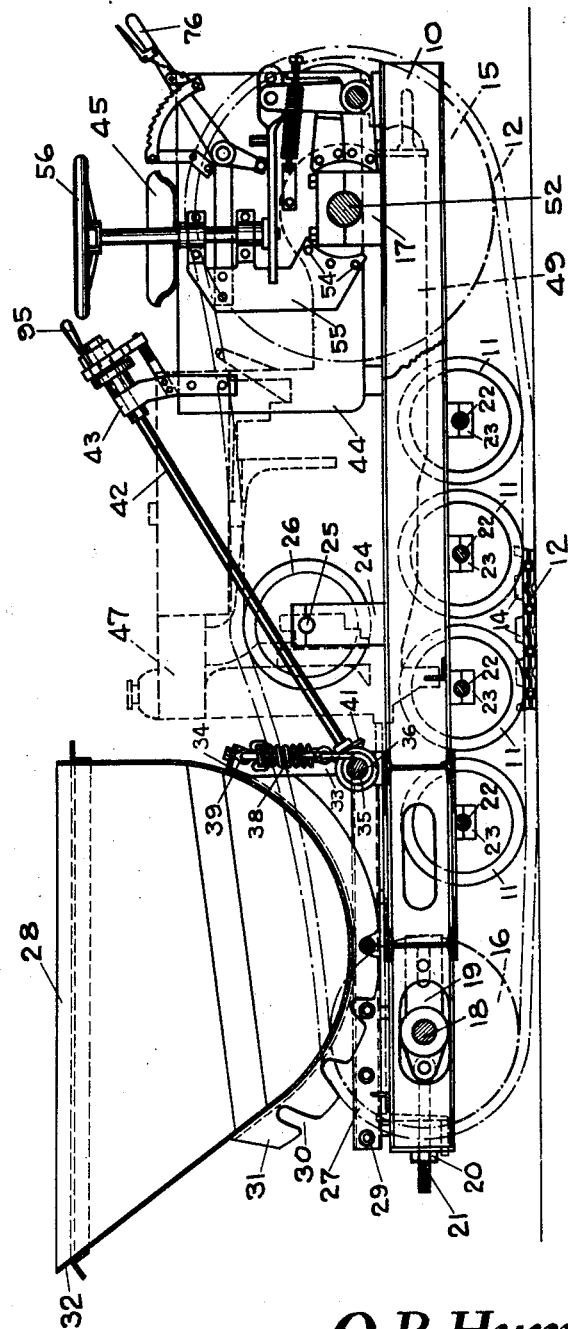

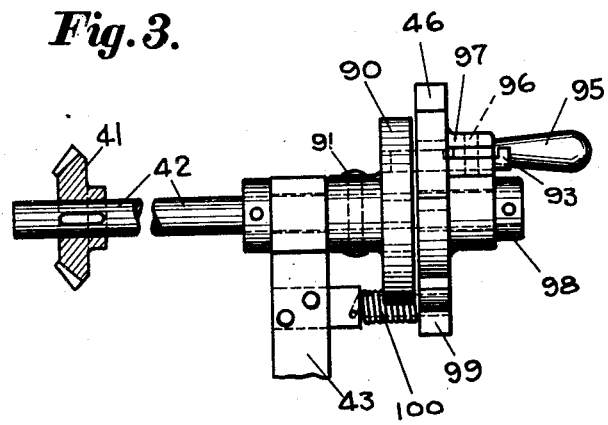
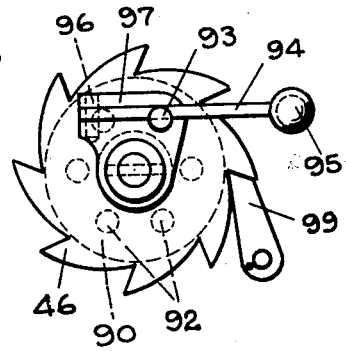
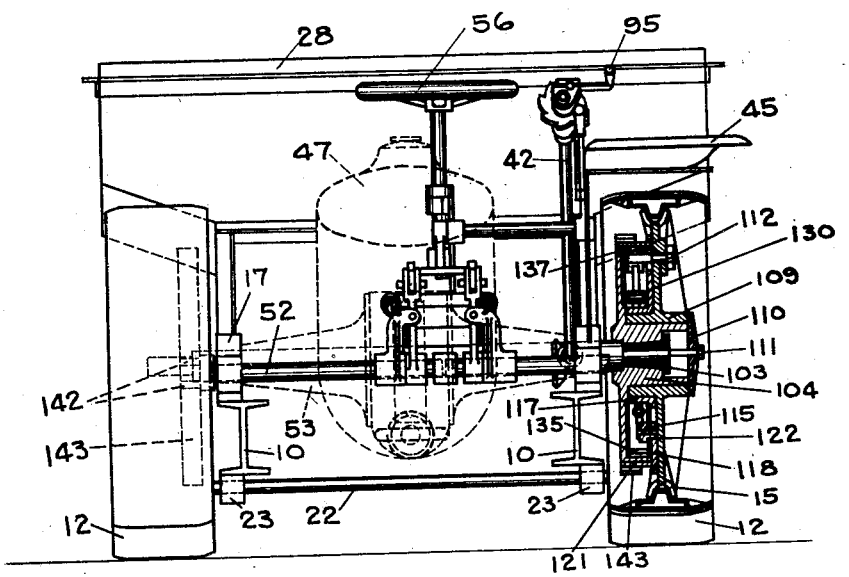

Patented Dec. 1, 1931

1,834,211

UNITED STATES PATENT OFFICE

WALTER G. HUMPHREYS AND OMAR R. HUMPHREYS, OF OMAHA, NEBRASKA

LAND VEHICLE

Application filed April 21, 1928. Serial No. 271,917.

The present invention relates to improvements in land vehicles and more particularly refers to a dumping vehicle.

An object of the invention is to provide a self-propelled vehicle adapted to travel over rough or uneven ground, while transporting a load of material, such as earth, forwardly of its motive power, whereby the load may be carried rearwardly of the front axle, and the load may be deposited forwardly of the front axle and in longitudinal alinement with the vehicle and engine.

Another object of the invention is to provide an improved dumping body or bucket, having improved guide means for directing it in its movement to dumping and upright positions.

A further object of the invention resides in providing an improved dump body, which is balanced, when loaded, to a dumping position, but which is restrained by improved means in an upright position.

A still further object of the invention is to provide a novel form of steering and braking mechanism for applying braking force to stop and hold the vehicle, and also for negotiating short turns.

A still further object of the invention is to provide a one-piece rear axle and differential compensating means therefor.

A still further object of the invention is to provide an improved self-propelled vehicle in which endless treads or tracks are employed for sustaining great loads in soft and uneven ground, wherein provision is made for the steering of the vehicle through the relative movement of the tracks.

With the foregoing and other objects in view, the invention will be more fully described hereinafter, and will be more particularly pointed out in the claim appended hereto.

In the drawings, wherein like symbols refer to like or corresponding parts throughout the several views, Figure 1 is a top plan view of a vehicle, with parts broken away, and parts shown in section, constructed according to the present invention.

Figure 2 is a vertical longitudinal section taken through the vehicle substantially along the line 2—2 of Figure 1.

Figure 3 is a side view, with parts broken away and parts shown in section of the ratchet or detent mechanism employed.

Figure 4 is an end view of the operating device for the ratchet mechanism.

Figure 5 is a rear elevation of the vehicle with one of the rear wheels and its compensating clutch steering mechanism shown in section.

Figure 6:
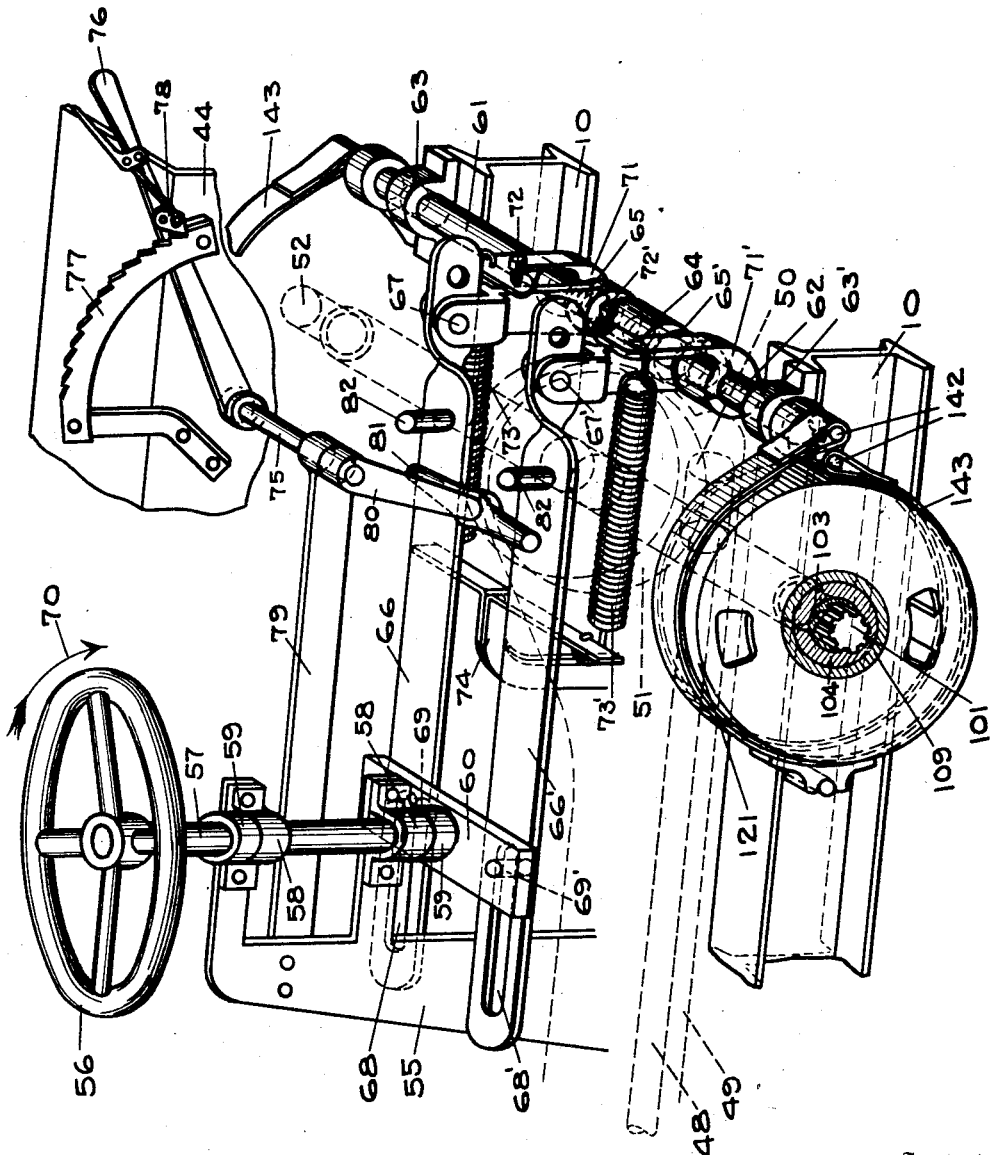
Figure 6 is an enlarged fragmentary perspective view of the steering and controlling mechanism with certain parts indicated in dotted lines.

Referring more particularly to the drawings, 10 designates a pair of I-beams, which are representative of the frame of the land vehicle or tractor; and 11 designates idler wheels registering at all times with the two endless sprocket chains, treads or tracks 12. The idler wheels, as shown in Figure 1, are provided with recesses 13 to receive the projections 14, Figure 2, of the sprocket chains, whereby to maintain the chains in proper alinement with respect to the idler wheels and to avoid lateral movement of the chains. The chains or endless tracks 12 are of substantial width to yield adequate sustaining mounting for the heavy vehicle in soft ground; and such chains pass over, and are driven by the rear sprocket wheels or drivers 15. At their front ends these sprockets or endless treads pass over the large front idler wheels 16. Both the drivers 15 and the front idlers 16 are raised above the idler wheels 11, which throws the weight of the machine on the intermediate idlers 11 and forces the intermediate parts of the lower flights of the chains against the ground. The peripheries of the wheels 15 and 16 are normally off the ground in order to facilitate arcuate movements of the vehicle of comparatively small radius in negotiating turns.

The rear wheels 15 are mounted upon a straight line axle which is journaled in pillow blocks 17 attached in any suitable manner upon the longitudinal beams 10 or other frame parts of the land vehicle.

The front idler wheels 16 are mounted on an axle 18 journaled in bearings provided in longitudinally movable slides 19 appropriately guided in the frame. The stretching or adjusting of the chains is accomplished by rotating the nuts 20, which are threaded upon the bolts 21 attached to the slides 19. The nuts 20 take against a frame part whereby to hold the adjusting devices in the adjusted position.

The idler wheels 11 are carried by the transverse shafts 22 journaled in the bearing blocks 23 secured beneath the journal beams or rails of the frame.

Centrally of the vehicle and upon the side rails 10 or other parts of the frame, are provided vertical supports 24 in which is journaled a transverse shaft 25 on which are mounted chain weight-supporting wheels 26 (Figure 2); it being understood that the sprocket track chains are very heavy.

Upon the forward portion of the vehicle are supplied rails or supporting members 27 on which the dump bucket 28 having the rounded bottom is adapted to rock. The supporting members 27 are connected by a plurality of anti-friction rollers which extend below the upper surfaces of the members 27. These rollers 29 are adapted to enter recesses or notches 30 in the arcuate guide plate 31, which may be of angle iron or other construction and secured to the rounded exterior bottom portion of the bucket 28.

The bucket 28 is adapted to have longitudinal rolling motion, during which the notches 30 engage about the rollers 29 as the bucket rolls forwardly or rearwardly, the weight of the bucket and its contents being supported upon the members 27. The bucket 28 is so constructed and arranged that when it is in a normal upright position, as shown in Figure 2, and loaded, it is balanced slightly to a dumping position; or in other words it is slightly over-balanced at the outer upper portion 32 which is extended outwardly beyond the supporting point of the bucket. The effect is to cause the bucket to automatically roll forwardly and dump its contents as soon as it is released from the upright position.

By means of the foregoing arrangement, the vehicle may be comparatively shorter in length since the bucket 28 is adapted to dump its contents forwardly of the front axle, and at the same time have the weight of the bucket transported rearwardly of said front axle during travel. Furthermore, by means of the foregoing-described arrangement, the dump bucket 28 may be carried forwardly of the motive power of the vehicle and be dumped in longitudinal alinement therewith.

In order that shocks and jars incident to travel over rough roads will not dislodge the bucket 28, a standard 33 is erected on the vehicle frame in position to be engaged by a transverse brace 34 on the bucket. This brace 34 may be formed integral with the angle irons 31. The brace 34 constitutes a stop for limiting the movement of the bucket when shifted to the upright position. The bucket 28, or dumping body, is retained in the upright position, shown in Figure 2, by means of the following mechanism:

A transversely disposed roller 35, best seen in Figure 1, is appropriately journaled for rotation in bearings carried by the vehicle frame. One end of a flexible cable 36 is attached to the roller by any suitable means, such as the eye-bolt 37. The cable is preferably wrapped or wound a suitable number of turns about the roller 35, and its opposite end is secured to a shock-absorbing spring 38. This spring, as best shown in Figure 2, is secured to the rear of the bucket or to the transverse brace 34 by means of an eye-bolt or keeper 39. Whenever the roller 35 is rotated in the direction to unwind the cable 36, the bucket will automatically tilt its point 32 downwardly on account of the location of its center of gravity or balance being forwardly of the rearmost guide roller 29. The shaft 35 is arranged to be driven from an operating device located convenient to the operator's position upon the vehicle, and for this purpose the roller 35, or its shaft, is provided with a bevel pinion 40 in mesh at all times with a similar operating pinion 41.

The pinion 41 is mounted upon the lower forward end of an operating shaft 42 which extends rearwardly and upwardly, its upper end being journaled in a supporting arm 43. This arm 43 is carried by a vertical plate 44, which is bolted or otherwise secured to the vehicle frame and is provided with a horizontal portion forming a platform upon which the operator's seat 45 may be conveniently placed.

Upon the shaft 42 is fixedly mounted a disc 90, as by use of a transverse pin 91. The disc is provided with a plurality of recesses or sockets 92, indicated in dotted lines in Figure 4. The recesses 92 are adapted to receive a removable pin 93 carried by a lever 94 having the operating handle 95 at its free end. The other end of the lever 94 is pivotally attached, as at 96, to a boss 97, which is loosely mounted upon the shaft 42. A bushing 98 is secured to the end of the shaft 42, as by pinning, to take up the thrust of the ratchet wheel 46 and its boss 97 and to prevent these members from sliding off the shaft 42. A dog 99 is pivotally attached to the arm 43 and is adapted to be returned at all times to a normal position in engagement with the teeth of the ratchet wheel 46 by a coil spring 100 wound around and associated with the pivot of the dog 99. The dog will prevent retrograde movement of the ratchet wheel 46 but will not interfere with its movement in the opposite direction.

When the operator pushes the lever 94 inwardly he engages the pin 93 with one of the sockets 92 in the socket wheel or disc 90 thereby locking the ratchet wheel 46 to the shaft 42, so that rotation of the handle 95 will cause rotation of the operating shaft 42 and the winding of the cable 36 upon the cable roller 35 to thereby restore the bucket 28 to the upright position. The ratchet 99 will prevent the parts from backing off and the mechanism may continue to hold the bucket in the elevated position until the operator manually swings the hand lever 94 outwardly to withdraw the pin 93 from engagement with the socket disc 90. When this withdrawal occurs the bucket 28 will be released and automatically dumped. By the use of this mechanism, the revolvable dumping movement of the bucket 28, as well as its return to normal position, are under the control of the operator at all times.

The engine or power plant of the vehicle is indicated generally at 47, it being understood that the crank shaft of the engine is adapted to communicate its motion at desired times to a propeller shaft 48, shown in dotted lines in Figure 6. The shaft 48 may be enclosed within a housing 49, also represented by dotted lines in the same figure. The rear end of the propeller shaft 48 is equipped with a worm 50 disposed in mesh at all times with a worm wheel 51.

It will be understood that, when the engine is in operation, rotary propulsive force, generated by the engine, may be communicated to the worm wheel 51 at desired times; and, that a suitable transmission gearing between the engine and the propeller shaft 48 may be employed, if desired. The worm wheel 51 is keyed to a rear axle 52 which consists of a straight continuous piece of shafting. The usual differential construction is omitted, compensating means for steering purposes being provided by the hereinafter described mechanism. By the provision of a straight line axle 52 of integral construction, the vehicle is made extremely sturdy, and consequently the worm gearing 50, 51 will maintain a proper clearance between its intermeshing parts, thereby decreasing the element of friction occasioned by heavy duty during the operation of the vehicle.

The steering of the vehicle is accomplished by mechanism which permits the power from the engine to be applied to a selected rear driving wheel or sprocket to the exclusion of its mate. The power, of course, in order to drive the vehicle forwardly or rearwardly, may be applied in unison, simultaneously and equally distributed between the rear wheels or sprockets. The arrangement furthermore permits of the mechanism acting as a brake on both rear wheels for maintaining the heavy vehicle stationary upon an inclined road or hill.

The rear axle 52 is preferably enclosed within a housing 53 in order to provide for automatic greasing of the worm gearing. The housing 53 may also form a portion of the housing of the propeller shaft 48 and is preferably formed of members, which are secured together by any suitable means, such as the bolts 54, best seen in Figure 2.

The bolts 54 may also be used for attaching an upstanding arm 55 to the vehicle. This arm 55, as shown in Figure 6, provides a rigid mounting for the steering gear and brake controlling mechanism.

Referring more particularly to Figure 6, it will be understood that the steering wheel 56 is suitably keyed to a steering shaft 57. This shaft 57 passes through appropriate bearings 58 supported by the arm 55. Collars 59 affixed to the shaft 57 above and below the bearings 58 serve to retain the shaft 57 against escaping upwardly and downwardly from the bearings, while permitting free rotary motion of the shaft. A horizontally-swinging lever 60 is attached to the lower end of the shaft 57, so as to rotate with the shaft. At the rear of the vehicle and preferably above the frame beams 10, are provided a pair of transversely disposed operating shafts 61 and 62 journaled to have independent rotary movement in suitable bearings 63 and 63'. These bearings are located upon the beams 10 and engage the outer portions of the control or operating shafts 61 and 62.

The inner ends of the shafts are supported within a sleeve 64 which preserves the alinement. Upon the shaft 61 is fixedly mounted a crank arm 65 having an upper bifurcated end to receive the rear end of a push-link 66. A pivot pin 67 connects the link with the crank arm. The forward end of the link 66 is provided with an elongated slot 68, within which is received a pin 69 depending from the lever 60 which is moved by the hand wheel 56. When the operator turns the wheel 56 in the direction of the arrow 70, the link 66 will be moved rearwardly of the vehicle thereby causing the shaft 61 to be rotated through a corresponding angular distance for a purpose later described. Loosely mounted upon the shaft 61 and adjacent the crank arm 65 is a spring arm 71 having a set screw 72 adapted to bear against the crank arm 65. The function of the set screw 72 is to adjust the arm 71 angularly with respect to the shaft and to the crank arm 65. A spring 73 is connected between the spring arm 71 and a support 74, which is secured to the frame of the vehicle in any suitable manner. The function of the spring 73 is to return the link 66 and shaft 61 to a normal position.

In like manner the companion control shaft 62 is provided with a fixed crank arm 65', coupled by a pin 67' to a push-link 66', which parallels the first mentioned push-link 66 and is arranged to extend under an opposite portion of the rotary member 60, there being a longitudinal slot 68' in the push-link 66' to receive a pin 69' projecting down from the member 60.

If the steering wheel 56 is rotated in a direction opposite to that indicated by the arrow 70, the pin 69' will engage the end wall of the slot 68' and force the push-link 66' backwardly to rock the shaft 62 to a corresponding angular distance. A spring arm 71' is loosely mounted on the shaft 62 and is provided with a set screw 72' for engaging the crank arm 65'. A coil spring 73' is attached to the arm 71' and to the support 74. During the operation of steering by means of the hand wheel 56, it is obvious that motion may be communicated to the shaft 61 to the exclusion of the other shaft 62; or the shaft 62 may be moved by the operator, while the shaft 61 remains stationary.

Both shafts 61 and 62 are not moved simultaneously, except for braking purposes and the detaining of the vehicle upon a hill, which is accomplished by the following mechanism:—

A shaft 75 is mounted for rocking rotary movement upon the side of the vertical plate 44. A hand lever 76 is secured to the shaft 75 and disposed to move over a toothed sector 77. The hand lever 76 carries a pawl 78 for cooperating with the teeth of the sector to hold the lever in adjusted position. The shaft 75 extends toward the central portion of the machine, where it is supported by a bearing carried by a web or beam 79. Adjacent this web, the shaft fixedly carries a crank arm 80 extending downwardly toward the links 66 and 66' and having a laterally extending cross head or push-blocks 81 disposed in the path of lugs 82 upon the links.

The push-blocks are arranged to simultaneously engage the lugs 82 for the purpose of pushing both links rearwardly and turning both shafts 61 and 62 when the hand lever 76 is shifted in one direction. This movement is permitted without interference from the steering mechanism because of the slots 68 and 68' in the links sliding freely past the pins 69 and 69'. By this means the two shafts 61 and 62 have simultaneous rotary movement. Upon a reverse movement of the lever 76, links 66 and 66' will be returned to a normal forward position by the action of the springs 73 and 73'. The pawl 78 and sector 77 may be utilized for maintaining the links 66 and 66' in a rearward position for braking effects by means of the mechanism hereinafter described.

The control shafts 61 and 62 are adapted to cooperate with clutch mechanism associated with the driving sprockets 15. This clutch mechanism is more fully shown and described in our co-pending application for patent entitled Clutches, Serial No. 207,929, filed July 23, 1927, and allowed December 10, 1927. The sprocket denoted by 6 in said co-pending application is the same as the driver 15 in the present case.

All other reference numerals used in the two cases on corresponding parts are the same except that in this application, 100 has been added to each of the reference numerals of the co-pending case; for example, the outer brake band 43 of the co-pending case is numbered 143 in the present case.

The ends of this brake band are connected to pins 142 on the ends of the control shafts 61 and 62, whereby rotation of the control shafts will loosen or tighten such brake bands upon the external brake drums 121. The power is applied to the axle 52, one end of which is shown in Figure 6 for the splined portion 101. The wedge block 103 is secured over this splined portion. The sleeve or hub 104 is affixed to the wedge-block. The hub 109 of the sprocket wheel is loosely mounted on the periphery of the sleeve 104 and is retained upon the sleeve by a washer 110 secured, as by a bolt 111 to the splined portion of the axle. A driving pin 112 is carried by each sprocket driver 15. The drivers are also provided with the lugs 115 projecting laterally therefrom. A sleeve or hub 117 is loosely mounted on the periphery of the hub 109 and carries a disc 118. This disc 118 supports the outer brake drum 121. The disc 118 is also provided with the lug 122 for the purpose more fully disclosed in the co-pending case.

The hub 104 is provided with an outwardly extending flange 137, the inner surface of which is adapted to contact with the brake lining 135.

In operation, power is applied from the engine through the propeller shaft 48 and worm gearing to the rear axle 52 and to the hub 104 and flanges 137 which are fixedly mounted on the ends of the axle.

As the clutches are normally engaged, when the drums 137 rotate, the drivers 115 will normally move therewith. However, when the control shafts 61 and 62 are turned so that the brake linings or bands 143 frictionally engage the brake drums 121, retarding or arresting the movement thereof, the discs 118 are likewise retarded or stopped. Through the action of the stop lugs 122, as more fully described in the co-pending application, the internal brake band 135 will be contracted and the drums 137 will be permitted to move freely.

The clutches are now disengaged, and the brake bands 143 can be further contracted to entirely stop the movement of the sprocket wheels or drivers 15. This condition will continue until the brake bands 143 are released by rotating the control shafts 61 and 62 in the opposite direction. This movement of the control shafts is had either by releasing the lever 76, or in the case of one control shaft, by rotating the steering wheel 56.

It will be understood that the clutches will be engaged without any attendant shocks and jars to the heavy vehicle and that the clutches may function as a brake by means of the operator utilizing the lever 76 for such purpose. Furthermore, one clutch may be applied to a rear wheel, while the other wheel remains idle and in this manner steering is accomplished.

We do not wish to be restricted to the size, form and proportions of the various parts, and obviously changes could be made in the construction herein described without departing from the spirit of the invention, it being only necessary that such changes fall within the scope of the appended claim.

What is claimed is:—

A dumping bucket tractor, comprising spaced longitudinal rows of wheels, a frame mounted on and lying between the upper portions of the rows of wheels, endless tread chains at opposite sides of the frame and having their lower runs passing beneath said rows of wheels, supporting and carrying means for said endless tread chains extending above the frame to carry the upper runs of the endless tread chains above the horizontal plane of the frame, and including driving connections between the engine and the tread chains, disposed upon the rear end portion of the frame, a dumping bucket mounted on the forward end of the frame between the upper runs of the tread chains and rearwardly of the forward ends of said tread chains, an engine mounted on the frame at its rear intermediate portion above the rear supporting wheels of said rows, and control connections between the engine and said tread chains disposed upon the rear end portion of the frame.

In testimony whereof, we affix our signatures.

WALTER G. HUMPHREYS.
OMAR R. HUMPHREYS.